United States Patent Office 3,068,294
Patented Dec. 11, 1962

3,068,294
XYLENE DIOL POLYFORMALS
Irving Rosen and Nelson V. Seeger, Painesville, Ohio, assignors to Diamond Alkali Company, Cleveland, Ohio, a corporation of Delaware
No Drawing. Filed Nov. 12, 1958, Ser. No. 773,167
1 Claim. (Cl. 260—611)

This invention relates to a new and improved method of forming aromatic formals and more particularly relates to a new and improved method of forming formals of certain mono- and di-hydroxy aromatic compounds, novel formals of hydroxy aromatic compounds per se, and certain novel reaction products thereof.

Broadly, the present invention comprises the process of preparing an aromatic formal by reacting substantially stoichiometric proportions of an aldehyde and an aromatic hydroxy compound of the structure

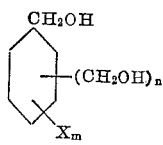

wherein X is halogen, $m$ is a number from 0 to $5_{-n}$ and $n$ is a number from 0 to 2, inclusive, preferably 1, in a solvent for the reactants, which solvent forms an azeotrope with water formed during the chemical reaction, and separating water from the azeotrope to obtain the desired aromatic formal in high yield and purity.

The term "aldehyde" as used in the specification and claim is intended to include various aldehydes containing the grouping (—CHO). Illustrative aldehydes are formaldehyde ($CH_2O$), or paraformaldehyde ($CH_2O)_3$, the latter being preferred at present. Other illustrative aldehydes are acetaldehyde, propionaldehyde, butyraldehyde, i-butyraldehyde, valeraldehyde, i-valeraldehyde, caproaldehyde, enanthaldehyde, nonaldehyde, palmitic aldehyde, acrolein, crotonaldehyde, tiglic aldehyde, propiolaldehyde, glycoxyl, succinaldehyde, adipaldehyde, benzaldehyde, tolualdehyde, alpha-tolualdehyde, cinnamaldehyde, salicylaldehyde, anisaldehyde, naphthaldehyde, and anthraldehyde.

Hydroxy compounds of the above type are illustrated by materials such as benzyl alcohol, p-xylylene diol, m-xylylene diol, o-xylylene diol, and mixtures of two or more of the foregoing, p-xylylene diol being a preferred reactant at present.

The solvents employed in the practice of the present invention are those which under the conditions of reaction form an azeotrope with the water liberated during the reaction from which azeotrope water can be removed to drive the reaction substantially to completion in the formation of the desired polyformal. Illustrative solvents are benzene, toluene, or xylene. A preferred solvent is benzene. While benzene does not dissolve paraformaldehyde or p-xylylene diol alone, ordinarily, as used in the practice of the present invention, the mixture of reactants is dissolved and a homogeneous solution is rapidly obtained in boiling benzene.

The term "catalyst" as employed in the specification and claim is intended to refer to a so-called "Lewis Acid" catalyst, such as ferric chloride, p-toluene sulfonic acid, stannic chloride, zinc chloride, sulfamic acid, or the like, as described in "Electronic Theory of Acids and Bases," Luder and Zuffanti (1946), pages 107–113, inclusive. At present, the preferred catalyst is p-toluene sulfonic acid employed in an amount of about 0.05 to 1% by weight of the hydroxy compound. The amount of catalyst generally employed comprises but a small percentage by weight of the hydroxy compound used. Typical amounts range from about 0.05 to 1% by weight of the hydroxy compound.

The hydroxy compound and aldehyde generally are employed in stoichiometric proportions although an excess of either reactant can be used if desired. The amount of solvent to be employed depends upon the solubility of the reactants and amounts of reactants used. Generally, it is preferred to use an amount of solvent not substantially greater than that necessary completely to dissolve the reactants and to form the desired azeotrope with water liberated during the reaction. Such a minimum amount can be determined readily once the reactant-solvent system is selected and the amounts of reactants established.

Formals of this invention find utility in various applications, e.g., in biologically active compositions such as herbicides, fungicides, bactericides, nematocides. Other applications involve use as resinous products, e.g., as film-forming substances, fibers and the like.

The temperature during the reaction should be maintained high enough to reflux the solvent, i.e., at the boiling temperature of the solvent, whereby the formed water-solvent azeotrope can be separated from the polyformal to obtain the latter in high yield and purity. Refluxing advantageously is carried out at atmospheric pressure although superatmospheric pressure or vacuum can be employed if desired so long as a water-solvent azeotrope is formed and separated.

In order that those skilled in the art may more completely understand the present invention and the preferred methods by which the same way be carried into effect, the following specific examples are offered:

EXAMPLE I

*Part A*

PREPARATION OF BENZYL FORMAL

Benzyl alcohol (56 ml., 59 g., 0.5 m.), paraformaldehyde (9 g., 0.3 m.), ferric chloride (1 g.), and benzene (100 ml.) are refluxed at atmospheric pressure in a flask for two hours, using a Dean Stark water trap to collect formed water; 6 ml. of water is separated from the benzene-water azeotrope. The reaction mixture is extracted with dilute HCl and water, dried with $MgSO_4$ and filtered. This product is then distilled at a temperature of about 184°–190° C. and 15 mm. Hg. There is thus obtained 42 g. of pure benzyl formal. Chemical analysis of the $C_{15}H_{16}O_2$ product is as follows:

| Element | Actual, Percent By Wt. | Calculated, Percent By Wt. |
|---|---|---|
| C | 79.4 | 78.8 |
| H | 6.95 | 7.03 |

*Part B*

Spore germination tests on glass slides are conducted via the test tube dilution method adopted from the procedure recommended by the American Phytopathological Society's committee on standardization of fungicidal tests. In this procedure, the product of Part A in aqueous formulations at concentrations of 1000, 100, 10 and 1.0 p.p.m. is tested for its ability to inhibit germination of spores from 7 to 10-day old cultures of *Alternaria oleracea* and *Monilina fructicola*. These concentrations refer to initial concentrations before diluting four volumes with one volume of spore stimulant and spore suspension. Germination records are taken after 20 hours of incubation at 22° C. by counting 100 spores. Results indicate that concentrations of 100–1000 p.p.m. and 10–100 p.p.m. afford disease control for the *A. oleracea* and *M. fructicola*, respectively.

Part C

To evaluate bactericidal activity, the test chemical is mixed with distilled water containing 5% acetone and 0.01% Triton X-155, at a concentration of 250 p.p.m. 5 ml. of the test formulation are put in a test tube. To the test tube is added *Staphylococcus aureus* in the form of a bacterial suspension in a saline solution from potato-dextrose agar plates. The tube is then incubated for 4 hours at 30° C. Transfers are then made to sterile broth with a standard 4 mm. loop and the thus-inoculated broth is incubated for 48 hours at 37° C. at which time only a 30% growth is observed as compared to 70% growth in a check sample.

Part D

Seeds of perennial rye grass and radish are treated in Petri dishes with aqueous suspensions of the test chemical at 1000 and 100 p.p.m. (1000 or 100 p.p.m. test chemical—5% acetone—0.01% Triton X-155—balance water). Lots of 25 seeds of each type are scatterd in separate dishes containing filter paper discs moistened with 5 ml. of the test formulation at each concentration. After 7 to 10 days under controlled conditions the test compound is given a rating which corresponds to the concentration that inhibits germination of half of the spores (ED 50) in the test or greater. Using this test, the product of Part A of this example received an ED 50 rating of less than 100 p.p.m. for the radish and 100–1000 p.p.m. for the rye grass.

Part E

In order to make an in vitro evaluation of the product of Part A of this example as a contact poison, non-plant parasite nematodes (*Panagrellus redivivus*) are exposed to the test chemical in small watch glasses (27 mm. diameter x 8 mm. deep) within a 9 cm. Petri dish. An aqueous test formulation (1000 p.p.m. test chemical—5% acetone—0.01% Triton X-155—balance water) is used. Results are recorded 24 hours after treatment and from these a nematode mortality of 100% at 1000 p.p.m. and 86% at 100 p.p.m. is observed.

It will be understood, of course, that the compounds of the present invention may be utilized in diverse formulations both liquid and solid, including finely-divided powders and granular materials, solutions, concentrates, emulsifiable concentrates, slurries and the like, depending upon the biological application intended and the formulation medium desired. Thus it will be appreciated that compounds of this invention may be employed to form biologically active substances containing such compounds as essential active ingredients thereof, which compositions may also include finely-divided dry or liquid diluents, extenders, fillers, conditioners, including various clays, diatomaceous earth, talc, spent catalyst, alumina silica materials and incorporating liquid solvents, diluents, etc., typically water and various organic liquids, such as kerosene, benzene, toluene, xylene, cyclohexanone and other petroleum distillate fractions or mixtures thereof.

When liquid formulations are employed, or dry materials prepared which are to be used in liquid form, it is desirable in certain instances to additionally employ a wetting, emulsifying or dispersing agent to facilitate use of the formulation, suitable surface active agents being set out, e.g., in an article by John W. McCutcheon in Soap and Chemical Specialties, vol. 31, Nos. 7–10 (1955).

The term "carrier" as employed in the specification is intended to refer broadly to the materials constituting a major proportion of a biologically active or other formulation and hence includes finely-divided material, both liquids and solids, as aforementioned, conventionally used in such applications.

EXAMPLE II

The procedure of Example I is repeated, refluxing 13.8 g. (0.1 m.) p-xylylene diol, 3 g. (0.1 m.) paraformaldehyde, 0.3 g. p-toluenesulfonic acid and 75 ml. benzene for 7 hours. There is separated 2.2 ml. of water in obtaining a white waxy benzene-soluble solid xylylene diol formal. (M.W. 1200) M.P. 83–4° C. This material is stable to heat, i.e., after being heated to 95° C. Overnight it is recovered unchanged, no cross-linking being observed.

EXAMPLE III

PREPARATION OF p-XYLYLENE DIOL FORMAL p-Xylylene diol (17.5 g., 0.125 m.), paraformaldehyde (3.8 g., 0.125 m.), ferric chloride (0.5 g.) and benzene (75 ml.) are refluxed at atmospheric pressure for four hours in a flask equipped with a Dean Stark water trap during which time 2.6 ml. of water is separated from the benzene-water azeotrope, 15 additional ml. of benzene being added toward the end of the reaction. The reaction mixture is washed with dilute HCl and water, dried over $MgSO_4$ and filtered. The benzene is then distilled off at room temperature. There results a yellow solid M.P. 63–64° C. (M.W. 2000). On heating the product to 85° C. overnight, a useful crosslinked material is obtained which is rubberlike but insoluble in organic solvents and forms pliable films.

EXAMPLE IV

Unlike other formals, the benzyl formal and p-xylylene formals of Examples I and II are unusually stable to acid hydrolysis as shown in the following data obtained by mixing the formal with methanol and concentrated HCl.

| Formal | Hours Hydrolyzed | Percent Decomposed |
|---|---|---|
| Dioxethane [1] | 3 | 79 |
| Benzyl | 16 | 15 |
| p-Xylylene | 16 | 19 |

[1] Typical Aliphatic Formal.

These materials are useful in the formation of low temperature castable rubbers by cross-linking.

Other illustrative examples of the practice of this invention using the procedure and proportions of the foregoing examples unless otherwise indicated are as follows:

| No. Example | Variation from Prior Examples | Results | Molecular Weight |
|---|---|---|---|
| V | benzene replaced with toluene then with xylene. | final temp., 133° C. | 1,200 |
| VI | 50 ml. benzene | normal reaction | 1,600 |
| VII | xylene substituted for benzene. | do | M.P. 72–73° C. |
| VIII | Dowex 50-8X [1] (.3 g.) as catalyst. | product became wax after 4 hrs. at 195° C. | M.P. 42–43° C. |
| IX | half the amount of paraformaldehyde. | | 1,100 |
| X | twice the amount of paraformaldehyde. | | 1,100 |
| XI | sulfamic acid as catalyst | | 1,200 |

[1] A sulfonated and cross-linked polystyrene ion exchange resin.

EXAMPLE XII

To produce a poly-p-xylylene diol formal of increased molecular weight, a poly-p-xylylene diol formal is heated under vacuum; the results of a series of such experiments, indexed comparatively, are as follows:

| Temp. (° C.) | mm. Hg | Time (hrs.) | Initial M.W. | Final M.W. |
|---|---|---|---|---|
| 250 | 2 | 3 | 1,000 | 3,600 |
| 250 | 0.5 | 3 | 1,000 | 3,300 |
| 250 | 1.5 | 4 | 1,000 | 2,900 |
| 250 | 1 | 10 | 1,000 | 3,600 |
| 168 | 2 | 2.5 | 1,400 | 1,600 |

EXAMPLE XIII

Part A p-Xylylene diol (69 g., 0.5 mol), paraformaldehyde (16 g., 0.53 mol), p-toluene sulfonic acid (0.5 g.) and benzene (250 ml.) are refluxed with constant agitation for 2½ hours during which time 9.6 ml. of $H_2O$ distills over and is separated. The benzene is then evaporated to obtain a formal M.P. 116–116.5° C. (crude). After two recrystallizations the M.P. is 115–115.5° C. (M.W. 1400).

Part B

To 5 g. of the product of Part A is added 1 g. tolylene diisocyanate. This mixture is heated at 140° C. for 0.5 to 1.0 hour to obtain a dark reddish cross-linked resin.

Part C

In 75 ml. of toluene are combined 8 g. of the product of Part A and 1 g. of tolylene diisocyanate. This mixture is refluxed for one hour in a nitrogen atmosphere to obtain a brownish red crosslinked resin insoluble in tetrahydrofuran.

Part D

To 4 g. of the product of Part A (washed with NaOH and acetic acid) are added 0.5 g. tolylene diisocyanate. This mixture is heated for ½ hour in a nitrogen atmosphere. The product is a yellowish resin stable at 109° C.

EXAMPLE XIV p-Xylylene diol (13.8 g.), paraformaldehyde (3.2 g.), Dowex 50X8 (0.3 g.) and benzene (75 ml.) are refluxed for three hours during which time 1.9 ml. of water is separated. The Dowex 50X8 is filtered off and the benzene solution recovered. 4.8 g. of the p-xylylene diol formal (M.W. 830) thus-obtained is refluxed with 1 g. tolylene diisocyanate dissolved in 50 ml. of toluene. There results a clear solution containing high molecular weight linear polymer soluble at 109° C. and having a molecular weight of about 10,000 as determined by isocyanate group analysis.

EXAMPLE XV

There are refluxed together 13.8 (0.1 mol) p-xylylene diol, 3.2 g. (0.1 mol) paraformaldehyde, 0.9 g. Dowex 50 and 75 ml. benzene until 3 ml. $H_2O$ separates. The Dowex 50 is then separated and the benzene distilled off. 3.5 g. of the resulting product (M.W. 1200) and 0.5 g. tolylene diisocyanate are melted in a nitrogen atmosphere to obtain an almost white wax-like resin soluble at 109° C. and uncrosslinked. The molecular weight of this polymer, from isocyanate group analysis, is greater than 10,000.

While there have been described various embodiments of the invention, the methods and products described are not intended to be understood as limiting the scope of the invention, as it is realized that changes therewithin are possible, and it is further intended that each element recited in the following claim is to be understood as referring to all equivalent elements for accomplishing substantially the same results in substantially the same or equivalent manner, it being intended to cover the invention broadly in whatever form its principle may be utilized.

What is claimed is:

Xylylene diol polyformal having a molecular weight within the range of about 1000 to 2000, produced by the reaction in a solvent selected from the group consisting of benzene, xylene, and toluene, said solvent forming an azeotrope with water liberated during the reaction of approximately stoichiometric proportions of paraformaldehyde and a xylylene diol selected from the group consisting of p-xylylene diol and m-xylylene diol at the reflux temperature of the solvent in the presence of about 0.05 to 1% by weight of the xylylene diol of a Lewis acid catalyst and removal of the water and solvent by distillation.

References Cited in the file of this patent

UNITED STATES PATENTS

| | | |
|---|---|---|
| 2,415,046 | Senkus | Jan. 28, 1947 |
| 2,621,214 | Deinet | Dec. 9, 1952 |
| 2,786,081 | Kress | Mar. 19, 1957 |
| 2,866,774 | Price | Dec. 30, 1958 |
| 2,867,608 | Landrum et al. | Jan. 6, 1959 |
| 2,873,266 | Urs | Feb. 10, 1959 |

OTHER REFERENCES

Carre: Compt. Rend., vol. 186 (1928), pages 1629–1630.

Freudenberg et al.: Ber. Deut. Chem., vol. 74 (1941), pages 1400–1406, page 1406 relied on.